Figure 1:
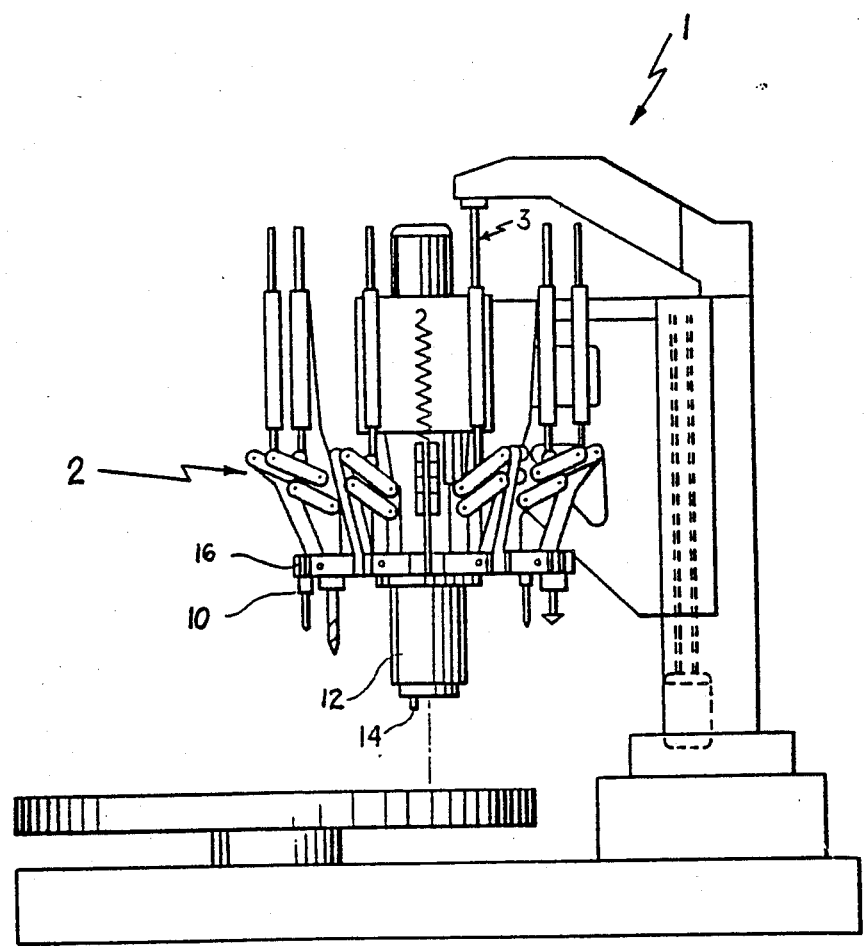

United States Patent [19]

Winkler et al.

[11] Patent Number: 4,910,860
[45] Date of Patent: Mar. 27, 1990

[54] TOOLHOLDER FOR A MACHINE TOOL

[75] Inventors: Hans-Henning Winkler, Tuttlingen; Eugen Rütschle, Mühleheim, both of Fed. Rep. of Germany

[73] Assignee: Chiron-Werke GmbH & Co. KG, Tuttlingen, Fed. Rep. of Germany

[21] Appl. No.: 256,823

[22] Filed: Oct. 11, 1988

[30] Foreign Application Priority Data

Oct. 14, 1987 [DE] Fed. Rep. of Germany ....... 3734718

[51] Int. Cl.$^4$ .......................................... B23Q 3/157
[52] U.S. Cl. ................................ 29/568; 279/1 A; 279/1 TS
[58] Field of Search ............. 29/568, 26 A; 279/1 TS, 279/1 B, 1 A; 211/1.5

[56] References Cited

U.S. PATENT DOCUMENTS 3,672,691  6/1972  Hammond ........................ 279/1 TS
4,616,398  10/1986  Rütschle et al. ...................... 29/568

FOREIGN PATENT DOCUMENTS 2647633  10/1976  Fed. Rep. of Germany .
3320874  6/1983  Fed. Rep. of Germany .
8502937  2/1985  Fed. Rep. of Germany .
2496532  12/1981  France .
5988236  11/1982  Japan .
426132  9/1933  United Kingdom .

Primary Examiner—Z. R. Bilinsky
Attorney, Agent, or Firm—Rosenblum, Parish & Bacigalupi

[57] ABSTRACT

A toolholder is provided for a machine tool where a plurality of standardized toolholders, in particular steeptaper toolholders, can be picked up from a tool magazine by means of grippers and can be introduced into a spindle of a spindle stock. The toolholder comprises an annular flange having an upwardly converging outer conical surface. The gripper can be provided with an inner conical surface widening towards the top. The two surfaces come into frictional engagement with each other under the action of the own weight of the toolholder, during introduction of the toolholder into the spindle, while the surfaces are lifted off from each other when the toolholder occupies its fully engaged position in the spindle.

In order to enable standardized toolholders with relatively small angular flanges to be used also in machine tools whose grippers are adapted for so-called brake-bearing toolholders with flanges of larger dimensions, the inner conical surface is provided on an annular insert which can be fitted as an adapter in grippers designed for toolholders with annular flanges of larger diameter.

8 Claims, 3 Drawing Sheets

TOOLHOLDER FOR A MACHINE TOOL

The present invention relates to a toolholder for a machine tool where a plurality of standardized toolholders, in particular steep-taper toolholders, can be picked up from a tool magazine by means of grippers and can be introduced into a spindle of a spindle stock, the toolholder comprising an annular flange having an upwardly converging outer conical surface, while the gripper can be provided with an inner conical surface widening towards the top, the two surfaces coming into frictional engagement with each other under the action of the own weight of the toolholder, during introduction of the toolholder into the spindle, while the surfaces are lifted off from each other when the toolholder occupies its fully engaged position in the spindle. Another toolholder for a machine tool, whose annular flange includes a so-called brake bearing, has been known already from U. S. Pat. No. 4,616,398. The brake bearing consists of an inner annular part fixed to the annular flange of the toolholder, and an outer annular part which is permitted to rotate freely relative to the inner annular part and on which the toolholder can be retained easily by means of the gripper and can remain in this retained condition when the toolholder rotates together with the spindle, during operation of the tool. During introduction of the toolholder into the spindle, the inner annular part is in frictional engagement with a matching counter-surface of the gripper. consequently, the toolholder is braked relative to the rotating spindle wiht the result that a key arranged in the spindle is permitted to slide along a radial annular surface of the annular flange of the toolholder without entraining it, and can find in this manner its matching groove by the shortest way so that the rotating spindle and the toolholder can be brought into form-locking engagement. Once the toolholder occupies its fully engaged position in the spindle, the surfaces, which are in frictional engagement with each other, are lifted off from each other and the toolholder is permitted to rotate freely, without being braked by the gripper. In the case of the known toolholder it is necessary to provide the before-described installations in the area of its annular flange, including a ball bearing and the described annular parts which, in combination with the so-called brake bearing, result in dimensions of the annular flange greater than those of the annular flanges of standardized toolholders, for example of standardized steep-angle taper 30 or steep-angle taper 40 toolholders.

In the applicant's co-pending patent application Ser No. 063,121, a gripper is described which is made to receive standardized toolholders, in particular steep-taper toolholders. The gripper according to this co-pending patent application is made such that a braking effect occurs during introduction of the standardized toolholder into the spindle.

However, the special brake-bearing type toolholder as first described above and the standardized toolholders, as secondly described above, are not compatible with each other because, due to the different diameters of their annular flanges, brake-bearing type toolholders do not fit into grippers, designed for receiving standardized toolholders, because the latter have a smaller diameter and, vice versa, standardized toolholders cannot be held in form-locking engagement in a gripper, designed for brake-bearing type toolholders, because the latter have a larger diameter of their annular flange.

Therefore, it is an object of the present invention to improve a toolholder of the type, described at the outset, such that standardized toolholders, in particular steep-taper toolholders, can be also used in a machine tool equipped with a gripper adapted for brake-bearing toolholders as described in U.S. Pat. No. 4,616.398.

This object is achieved according to the invention by the fact that the inner conical surface is provided on an annular insert which can be fitted as an adapter in grippers designed for toolholders with annular flanges of larger diameter. This solves the object underlying the present invention perfectly and completely, it being possible with the aid of the insert to adapt the smaller standard dimensions of the annular flange to the larger diameters of the brake-bearing flange. Being not subjected to essential mechanical stresses, the insert may consist of a cheap plastic material.

In the case of machine tools of the type which are of interest here, the toolholders are usually picked up from nests in the tool magazine by means of hinged gripper arms with grippers provided at their free ends, and transferred to the spindle of the spindle stock and then, after completion of the operation, returned to the magazine in the same way.

Consequently, it would be possible to provide the inserts on the grippers of the gripper arms and on the corresponding inserts of the machine tool; however, it is preferred for the purposes of the present invention to provide the inserts on the standardized toolholders so that no re-tooling operations will be required on the machine tool and standardized toolholders can be combined at desire with brake-bearing toolholders.

It is preferred in this connection that the insert consists of two substantially semicircular halves which are hinged at one of their ends and provided with releasable connections at the other ends.

This feature provides the adavantage that the insert can be fitted about the annular flange of a standardized toolholder in a very simple manner so that only a few manipulations are required in the area of the annular flange to give it the outer dimensions required to make it compatible with grippers and magazine nests to brake-bearing toolholders.

According to a preferred improvement of this variant, the connection means are designed as elastic snap-on connection comprising a detent arranged on one end of one of the halves for engaging, in the locked condition, behind a projection provided on the other half.

This feature provides the advantage that the operation of fitting standardized toolholders with inserts is rendered particularly easy because—as mentioned before—the two halves only have to be placed around the standardized annular flange and to be snapped into position by pressing the two halves together.

Further, it is preferred in the case of this variant that a free end of the detent exhibits a certain clear spacing from the projection in the locked condition.

This feature provides the advantage that the insert can be removed from the standardized toolholder without any tools, the user being required only to reach with his finger into the spacing between the end of the detent and the projection and to release the connection by bending the two halves of the insert apart.

Other advantages of the present invention will appear from the following description and the attached drawing.

It is understood that the features that have been described above and will be explained hereafter can be used not only in the described combinations, but also in any other combination or individually, without leaving the scope of the present invention.

Figure 1A:
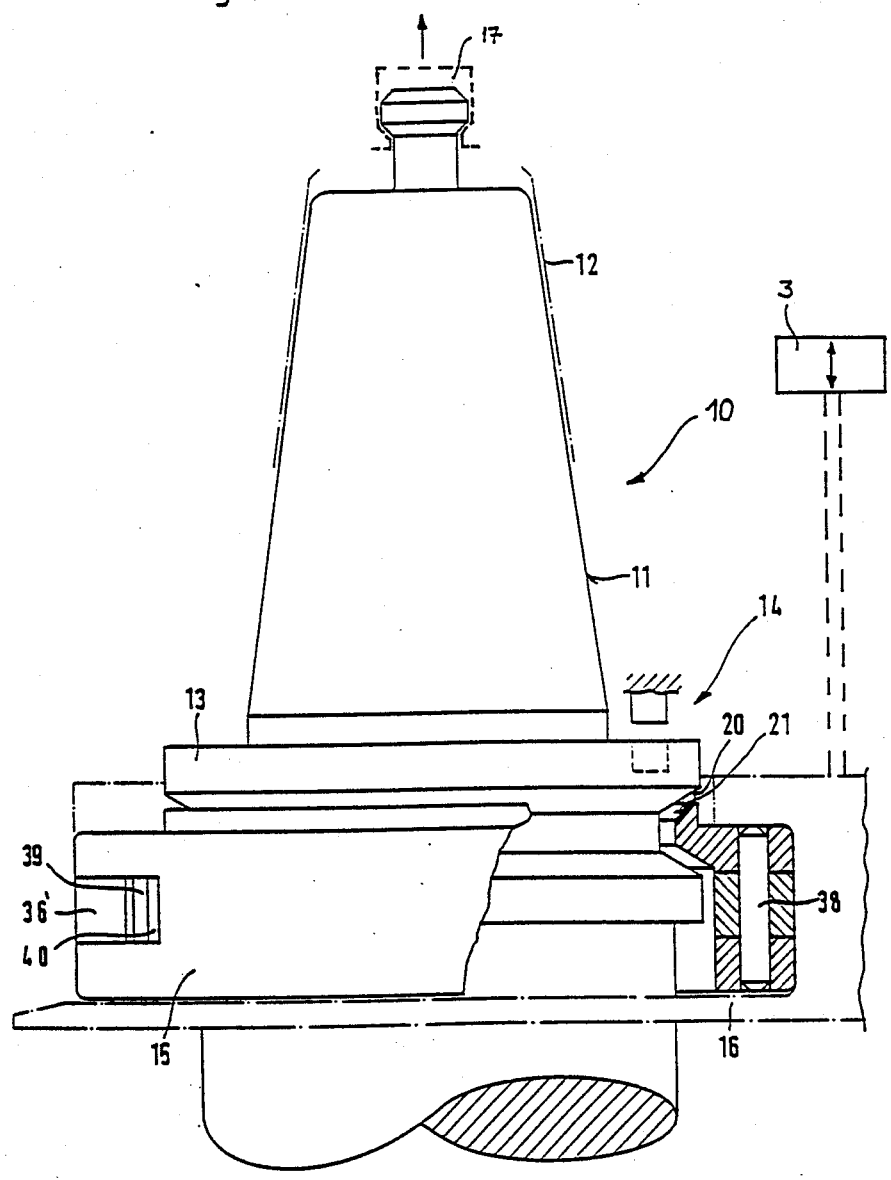
Figure 2:
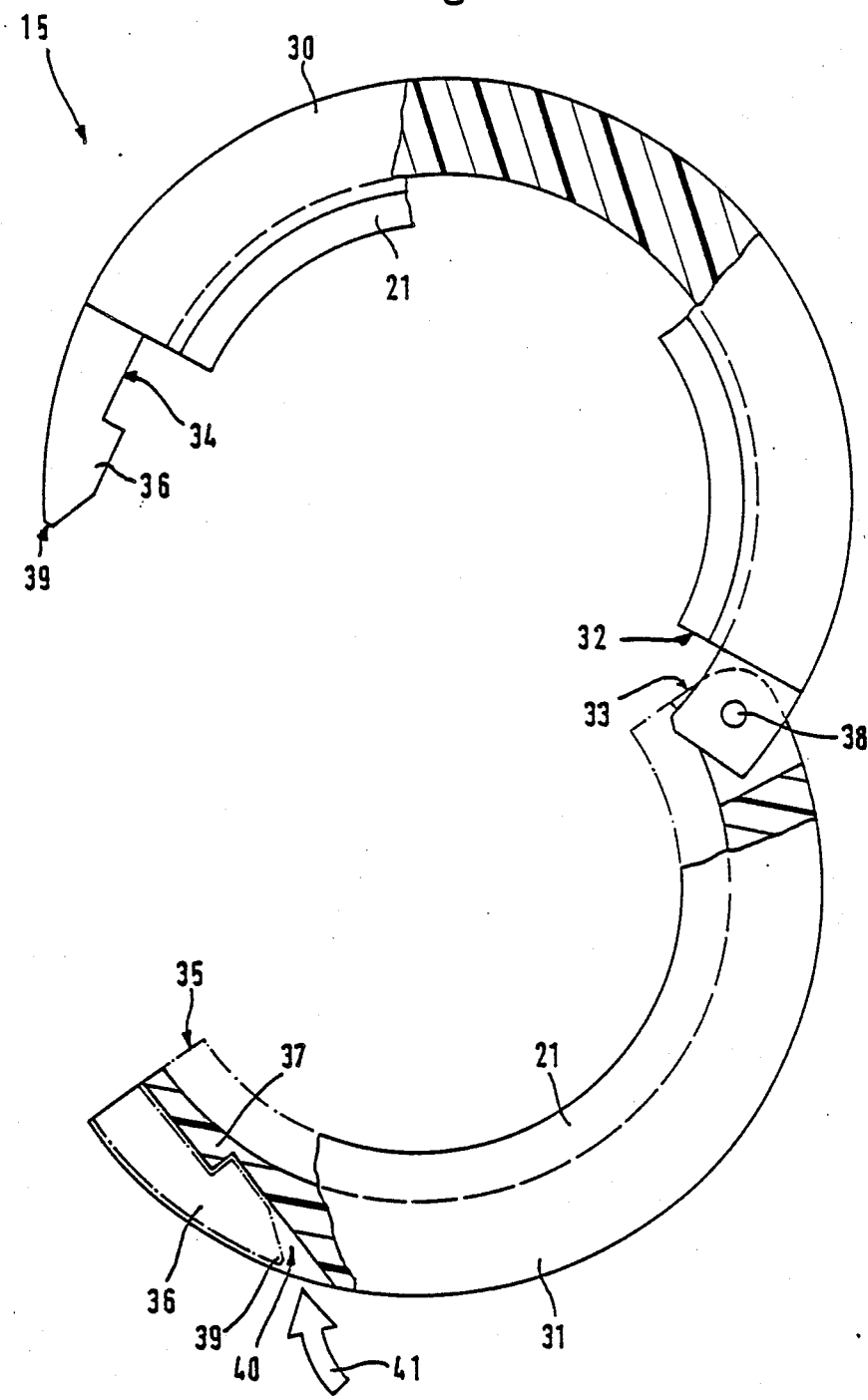

One embodiment of the invention will now be descibed in more detail with reference to the drawing in which:

FIG. 1 is a simplified side elevational view of a machine tool; FIG. 1A is a side view of a tool holder according to the invention, with certain parts broken away and others shown in cross-sectional representation; and FIG. 2 shows an insert for use in a toolholder according to FIG. 1A, in the open condition and likewise with certain parts shown in cross-sectional representation.

In FIGS. 1 and 1A, reference numeral 10 designates a toolholder of standardized design with a steep-angle cone 11, i.e. a steep-angle cone 30 or 40.

The steep-angle cone 11 of the toolholder 10 can be mounted in the conventional manner in a spindle 12 of a machine tool 1 (which is depicted only schematically in FIG. 1. The toolholder 10 may be transported between a toolholder magazine, indicated at 2 and the spindle 12. For mounting the toolholder 10, the latter is initially lifted vertically by means of a lifting mechanism 3 and fitted loosely in the spindle 12 and then pulled into the spindle 12 in the actual direction by means of suitable chucking means as indicated at 17 so that the steep cone 11 comes to rest against a complementary recess in the spindle 12.

Reference numeral 13 designates an annular flange of the toolholder 10, and reference numer 14 indicates that normally a key of the spindle 12 engages an associated groove provided in a radial annular surface of the annular flange 13 so as to establish a form-locking connection between the toolholder 10 and the spindle 12 also in the direction of rotation.

It has been known before to brake the toolholder 10 relative to the rotating spindle 12 during the "search run" of the toolholder 10, i.e. until the spring-loaded key 14 has come into engagement with the groove, in order to prevent the key 14 from getting stuck on a point of the continuous surface of the annular flange 10 and from rotating therewith without ever coming into engagement with its associated groove.

This is achieved in the case of the present invention by means of an insert 15 surrounding the annular flange 13 on all sides and fitting into a gripper 16 of the machine tool, preferably in form-locking engagement. the outer dimensions of the insert 15 are selected in such a manner that the outer contour of the annular flange 13, with its insert 15, conforms to the outer contour of a so-called brake-bearing toolholder of the type described by U.S. Pat. No. 4,616,398. The gripping dimensions of the gripper 16 are adapted for toolholders of this type. This means that a standardized toolholder 10 which is provided with an insert 15 can be used in machine tools whose grippers 16 are adapted for brake-bearing toolholders.

The upper area of the annular flange 13 of the toolholder 10 is provided with a downwardly converging outer conical surface 20 coacting with a preferably parallel, upwardly widening inner conical surface 21 of the insert 15.

FIG. 1 illustrates the case where the toolholder 10 is already fully seated in the spindle 12. The outer conical surface 20 is lifted off the inner conical surface 21 in this position so that the toolholder 10 is permitted to rotate freely in the insert 15. Besides, the diameter of the inner contour of the insert 15 are also larger than the diameters on the annular flange 13. During introduction of the toolholder 10 into the spindle 12, the outer conical surface 12 is, however, in contact with the inner conical surface 21 of the insert 15, the surfaces 20 and 21 being in frictional engagement with each other, due to the own weight of the toolholder 10. The friction effect may be increased in the conventional manner if the surfaces 21, 22 are roughened. As a result of this friction effect, the toolholder 10 is braked against rotary movements, during introduction into the spindle 12, and the key is caused to slide along the annular surface of the annular flange 13 until it comes into engagement with the matching groove.

FIG. 2 shows clearly that the insert 15 consists of two half-shells, namely a first half 30 and a second half 31. A first end 31 of the first half 30 is hinged on a second end 33 of the second half 31, while a third end 34 of the first half 30 is connected with a fourth end 35 of the second half 31 via releasable connection means.

The releasable connection means are constituted by a detent 36 provided on the third end 34 and a projection 37 arranged on the fourth end 35, while the hinged connection between the first end 32 and the second end 33 is formed by an axial pin 38. In the lower half of FIG. 2 it is shown by dash-dotted lines how the detent 36' engages elastically behind the projection 37 in the locked condition. A forward free end 39 of the detent 36 is tapered in such a manner that in the locked condition a clear space 40 remains between the free end 39 and the projection 37. It is, therefore, possible for the user of the insert 15 to reach with his fingers into the spacing between the free end 39 and the projection 37, in the direction indicated by arrow 41, and to release the elastic snap-in connection by lifting off the detent 36. Preferably, the halves 30, 31 of the insert 15 are designed as injection-molded plastic parts.

We claim:

1. A machine tool comprising:
    a gripper for transporting toolholders between a toolholder magazine and a spindle of said machine tool, said gripper having an inner annular groove of a first diameter;
    a toolholder having an outer annular flange of a second diameter, said second diameter being smaller than said first diameter, said outer annular flange being provided with a first conical surface converging downwardly;
    an annular insert surrounding said outer annular flange and having a second inner conical surface converging downwardly for receiving said outer annular flange of said toolholder, said insert being made to fit into said inner annular groove of said gripper while locked against rotation therein;
    lifting means for vertically lifting said gripper with said first conical surface frictionally resting on said second conical surface and said toolholder having a weight and exerting a vertical force on said second conical surface;
    pulling means arranged in said spindle for pulling said toolholder into said spindle and lifting said first conical surface from said second conical surface when said toolholder is entirely inserted into said spindle.

2. The machine tool of claim 1, wherein said insert consists of a first and a second substantially semi-circular half, said halves being hinged to each other at first ends and being provided with releasable connecting means at their second ends.

3. The machine tool of claim 2, wherein said connection means are designed as an elastic snap-on connector comprising a detent arranged on one of said second ends for engaging, in a locked condition, behind a projection provided on the other of said second ends.

4. The machine tool of claim 3, wherein a free end of said detent exhibits a predetermined clear spacing from said projection in said locked condition.

5. An adapter for allowing a machine toolholder having an outer annular supporting flange of a first diameter with a first conical surface converging downwardly to be used in a machine including (a) a tool carrying spindle, (b) a gripper for transporting toolholders between a magazine and the tool carrying spindle, the gripper having an inner annular groove of a second diameter for mating with and supporting a toolholder, lifting means for vertically lifting the griper and (d) pulling means arranged in the spindle for pulling the toolholder into operative engagement wtih the spindle, said adapter comprising:

an annular insert having a central aperture defined by a second conical surface converging downwardly, said second surface being adapted to mate with said outer annular supporting flange of said toolholder, the outer surfaces of said insert being configured to mate with the inner annular groove of the gripper whereby in one case the toolholder may be supported by a magazine or gripper, with said first conical surface frictionally engaging and resting upon said second conical surface and in a second case, the toolholder may be separated therefrom by the pulling means as it pulls the toolholder into operative engagement with the spindle.

6. An adapter as recited in claim 5 wherein said insert includes first and second substantially semicircular parts said parts being hinged to each other at first ends thereof and being provided with releasable connecting means at their second ends.

7. An adapter as recited in claim 6 wherein said connection means are designed as an elastic snap-on connector including a detent arranged on one of said second ends for locking engaging a latching surface provided on the other of said second ends.

8. An adapter as recited in claim 7 wherein a free end of said detent exhibits a predetermined clear spacing from said latching surface when in locking engagement therewith.

* * * * *